United States Patent
Altberg et al.

(10) Patent No.: US 7,876,886 B2
(45) Date of Patent: *Jan. 25, 2011

(54) METHOD AND APPARATUS TO PROVIDE PAY-PER-CALL PERFORMANCE BASED ADVERTISING

(75) Inventors: Ebbe Altberg, Mill Valley, CA (US); Marc Barach, Oakland, CA (US); Scott Faber, San Francisco, CA (US); Michael Fordyce, San Francisco, CA (US); Chris Hickson, East Palo Alto, CA (US); Ron Hirson, San Francisco, CA (US); John Somorjai, San Mateo, CA (US); Sean Van Der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 1140 days.

This patent is subject to a terminal disclaimer.

(21) Appl. No.: 11/508,015

(22) Filed: Aug. 21, 2006

(65) Prior Publication Data

US 2007/0116217 A1  May 24, 2007

Related U.S. Application Data

(63) Continuation of application No. 10/679,982, filed on Oct. 6, 2003, now Pat. No. 7,120,235.

(51) Int. Cl.
*H04M 15/00* (2006.01)

(52) U.S. Cl. .............. 379/114.13; 705/14.4; 705/14.69; 705/14.72

(58) Field of Classification Search ........... 379/110.01, 379/111, 112.01, 112.06, 112.07, 114.01, 379/114.05, 114.13, 121.02, 124; 705/14, 705/26, 32, 14.4, 14.49, 14.55, 14.69, 14.72

See application file for complete search history.

(56) References Cited

U.S. PATENT DOCUMENTS

| 4,788,718 | A | 11/1988 | McNabb et al. |
| 5,774,534 | A * | 6/1998 | Mayer ................... 379/142.01 |
| 5,793,851 | A | 8/1998 | Albertson |
| 5,937,390 | A | 8/1999 | Hyodo |
| 6,418,214 | B1 | 7/2002 | Smythe et al. |
| 6,460,036 | B1 | 10/2002 | Herz |
| 6,510,434 | B1 | 1/2003 | Anderson et al. |

(Continued)

FOREIGN PATENT DOCUMENTS

KR    20010086595    9/2001

OTHER PUBLICATIONS

International Application No. PCT/US04/15238, Written Opinion and International Search Report, Aug. 29, 2005.

(Continued)

*Primary Examiner*—Binh K Tieu
(74) *Attorney, Agent, or Firm*—Greenberg Traurig, LLP

(57) ABSTRACT

In one embodiment, the invention provides a method. The method includes assigning a unique telephone number to an advertiser; providing an advertisement on a media channel on behalf of the advertiser, the advertisement including one of the unique telephone number and a reference to the unique telephone number; monitoring telephone calls to the unique telephone number; and billing the advertiser for telephone calls to the unique telephone number in accordance with a predefined model.

29 Claims, 12 Drawing Sheets

U.S. PATENT DOCUMENTS

| | | | |
|---|---|---|---|
| 6,570,870 | B1 | 5/2003 | Berstis |
| 6,769,020 | B2* | 7/2004 | Miyazaki et al. ............ 709/219 |
| 7,224,781 | B2* | 5/2007 | Jacob et al. ............ 379/114.05 |
| 7,366,683 | B2* | 4/2008 | Altberg et al. ........... 705/14.64 |
| 7,428,497 | B2* | 9/2008 | Agarwal et al. .......... 705/14.54 |
| 7,453,998 | B2 | 11/2008 | Jacob et al. |
| 2002/0095331 | A1 | 7/2002 | Osman et al. |
| 2002/0173319 | A1 | 11/2002 | Fostick |
| 2003/0046161 | A1 | 3/2003 | Kamangar et al. |
| 2003/0220866 | A1* | 11/2003 | Pisaris-Henderson et al. . 705/37 |
| 2004/0103024 | A1 | 5/2004 | Patel et al. |
| 2004/0254859 | A1 | 12/2004 | Aslanian |
| 2005/0114208 | A1* | 5/2005 | Arbuckle et al. .............. 705/14 |
| 2006/0069610 | A1 | 3/2006 | Rossini |
| 2007/0165805 | A1 | 7/2007 | Altberg et al. |
| 2007/0280443 | A1 | 12/2007 | Jacob et al. |
| 2009/0010408 | A1 | 1/2009 | Altberg et al. |
| 2009/0016507 | A1 | 1/2009 | Altberg et al. |
| 2009/0030755 | A1 | 1/2009 | Altberg et al. |
| 2009/0060148 | A1 | 3/2009 | Jacob et al. |
| 2009/0070205 | A1 | 3/2009 | Altberg et al. |
| 2009/0240561 | A1 | 9/2009 | Altberg et al. |

OTHER PUBLICATIONS

USPTO Transaction History of U.S. Appl. No. 10/679,982, filed Oct. 6, 2003, entitled "Method and Apparatus to Provide Pay-Per-Call Performance Based Advertising," now U.S. Patent No. 7,120,235.

USPTO Transaction History of U.S. Appl. No. 10/956,571, filed Oct. 1, 2004, entitled "Method and System to Connect Consumers to Information.".

USPTO Transaction History of U.S. Appl. No. 10/956,771, filed Oct. 1, 2004, entitled "Method and System to Connect Consumers to Information," now U.S. Patent No. 7,224,781.

USPTO Transaction History of U.S. Appl. No. 11/021,939, filed Dec. 23, 2004, entitled "Method and Apparatus to Compensate Demand Partners in a Pay-Per-Call Performance Based Advertising System."

USPTO Transaction History of U.S. Appl. No. 11/624,613, filed Jan. 18, 2007, entitled "Methods and Apparatuses for Pay for Deal Advertisements."

USPTO Transaction History of U.S. Appl. No. 11/678,032, filed Feb. 22, 2007, entitled "Methods and Systems for Pay for Performance Advertisements."

USPTO Transaction History of U.S. Appl. No. 11/688,115, filed Mar. 19, 2007, entitled "Methods and Apparatuses for Pay for Lead Advertisements."

USPTO Transaction History of U.S. Appl. No. 11/691,372, filed Mar. 26, 2007, entitled "Method and Systems to Connect Consumers to Information."

USPTO Transaction History of U.S. Appl. No. 11/876,704, filed Oct. 22, 2007, entitled "Systems and Methods to Provide Information and Connect People for Real Time Communications."

USPTO Transaction History of U.S. Appl. No. 11/960,638, filed Dec. 19, 2007, entitled "Systems and Methods to Dynamically Generate Listings to Selectively Track User Responses."

USPTO Transaction History of U.S. Appl. No. 12/127,363, filed May 27, 2008, entitled "Systems and Methods to Provide Information via Connection for Real Time Communications Between People."

USPTO Transaction History of U.S. Appl. No. 12/127,585, filed May 27, 2008, entitled "Systems and Methods for Dynamic Pay for Performance Advertisements."

USPTO Transaction History of U.S. Appl. No. 12/130,960, filed May 30, 2008, entitled "Systems and Methods to Generate Leads to Connect People for Real Time Communications."

USPTO Transactions History of U.S. Appl. No. 12/240,807, filed Sep. 29, 2008, entitled "Method and Systems to Connect Consumers to Information."

ISA/US, International Search Report for International Application No. PCT/US05/12061, 3 pages, Nov. 17, 2006.

* cited by examiner

← 114

SCROLL DOWN to see more listings       Refine your search by Zip Code:

Your search found 105 listings, Listings 1 to 15 listed below...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS                SCROLL DOWN for more listings
                                                                    City Gold

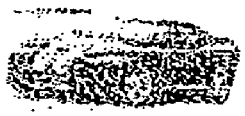  Dream Car Rentals
3734 Las Vegas Blvd.
LAS VEGAS, NV
Phone: (702)555-6661
Fax: (702) 555-6665

We Specialize in Excitement! Ferrari's. Viper's Porsche's & Hummers. Harley-Davidson's and SUV's. "DRIVE THE DREAM"

City Gold

RENT-A-VETTE
5021 SWENSON STREET
LAS VEGAS, NV 89119
Phone: (702) 555-2692
Fax: (702) 555-2044

ONLINE LISTINGS                                SCROLL DOWN for more listings Expedia: For All Your Car Rental Needs  http://www.expedia.com
Save with Expedia.com, your one-stop source for flights, hotels, vacation packages, cruises, and rental

FIG. 9

METHOD AND APPARATUS TO PROVIDE PAY-PER-CALL PERFORMANCE BASED ADVERTISING

This application is a continuation application of U.S. patent application Ser. No. 10/679,982, filed Oct. 6, 2003, now U.S. Pat. No. 7,120,235 entitled "A Method And Apparatus To Provide Pay-Per-Call Performance Based Advertising". The disclosure of which is incorporated herein by reference.

FIELD OF THE INVENTION

This invention relates to advertising. In particular, the invention relates to performance-based advertising.

BACKGROUND OF THE INVENTION

Performance based advertising refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in performance-based advertising, as described above.

SUMMARY OF THE INVENTION

A method and apparatus to provide pay-per-call performance based advertising. In one embodiment, a unique telephone number is assigned to an advertiser. An advertisement including the unique telephone number or a reference to the unique telephone number is provided on a media channel. Thereafter, telephone calls to the unique telephone number are monitored, and an assortment of data associated with the telephone calls is collected. The advertiser is charged for telephone calls to the unique telephone number in accordance with a predefined billing arrangement.

BRIEF DESCRIPTION OF THE DRAWINGS

FIG. 9 shows an example of a search engine result page, which includes an advertisement generated, in accordance with one embodiment of the present invention;

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
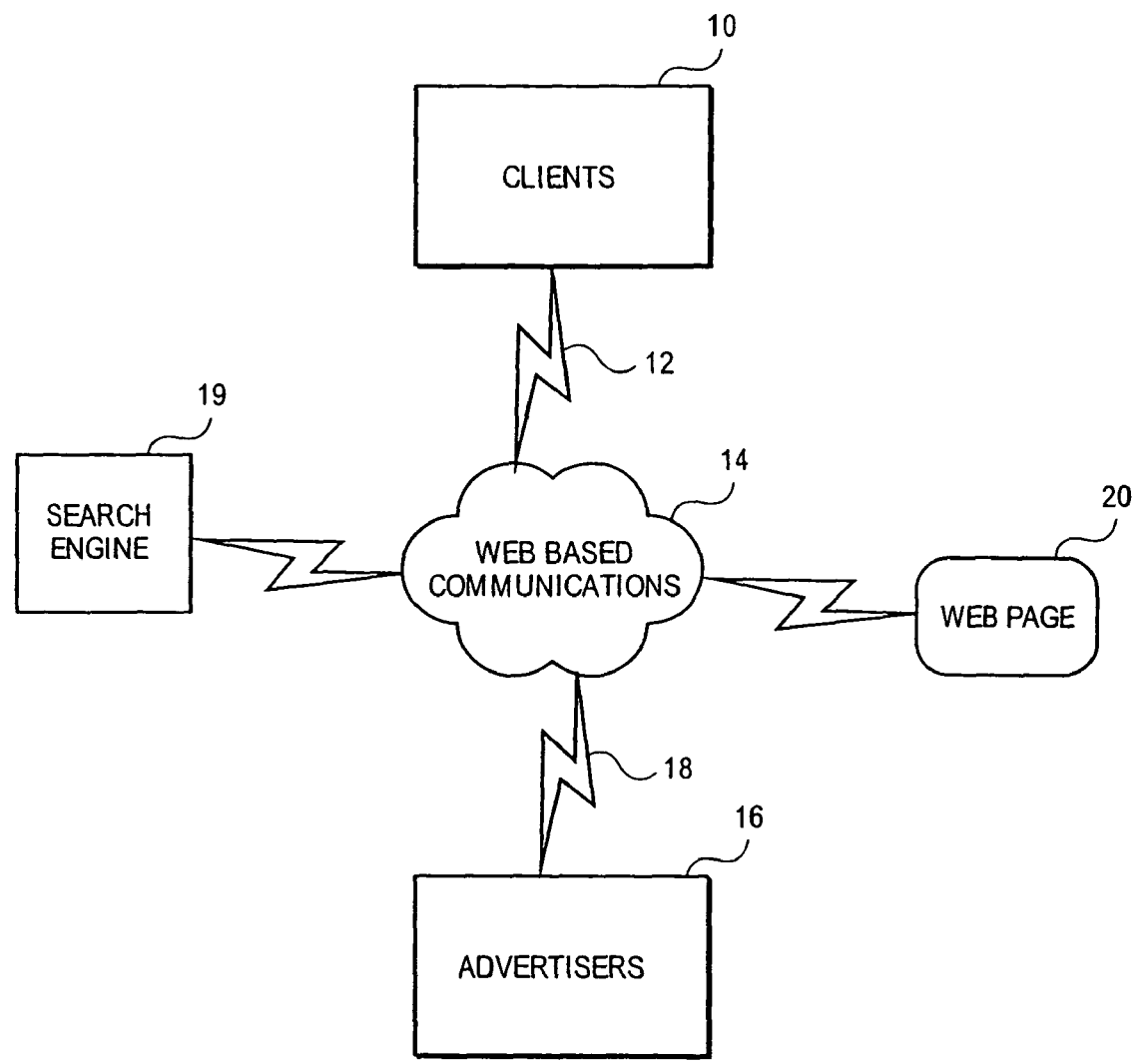
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
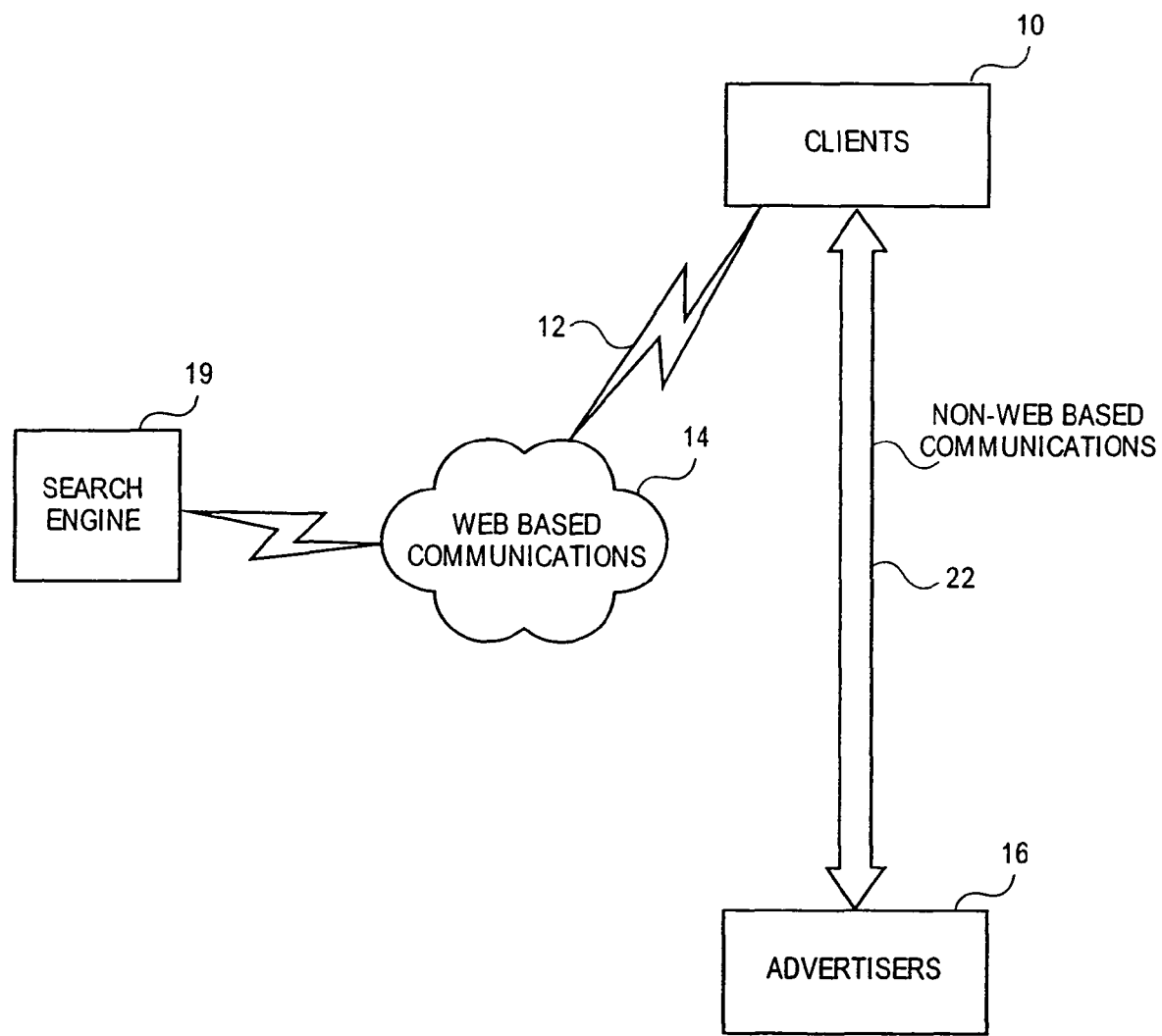
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path 18 between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages 20. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, etc.

Figure 3:
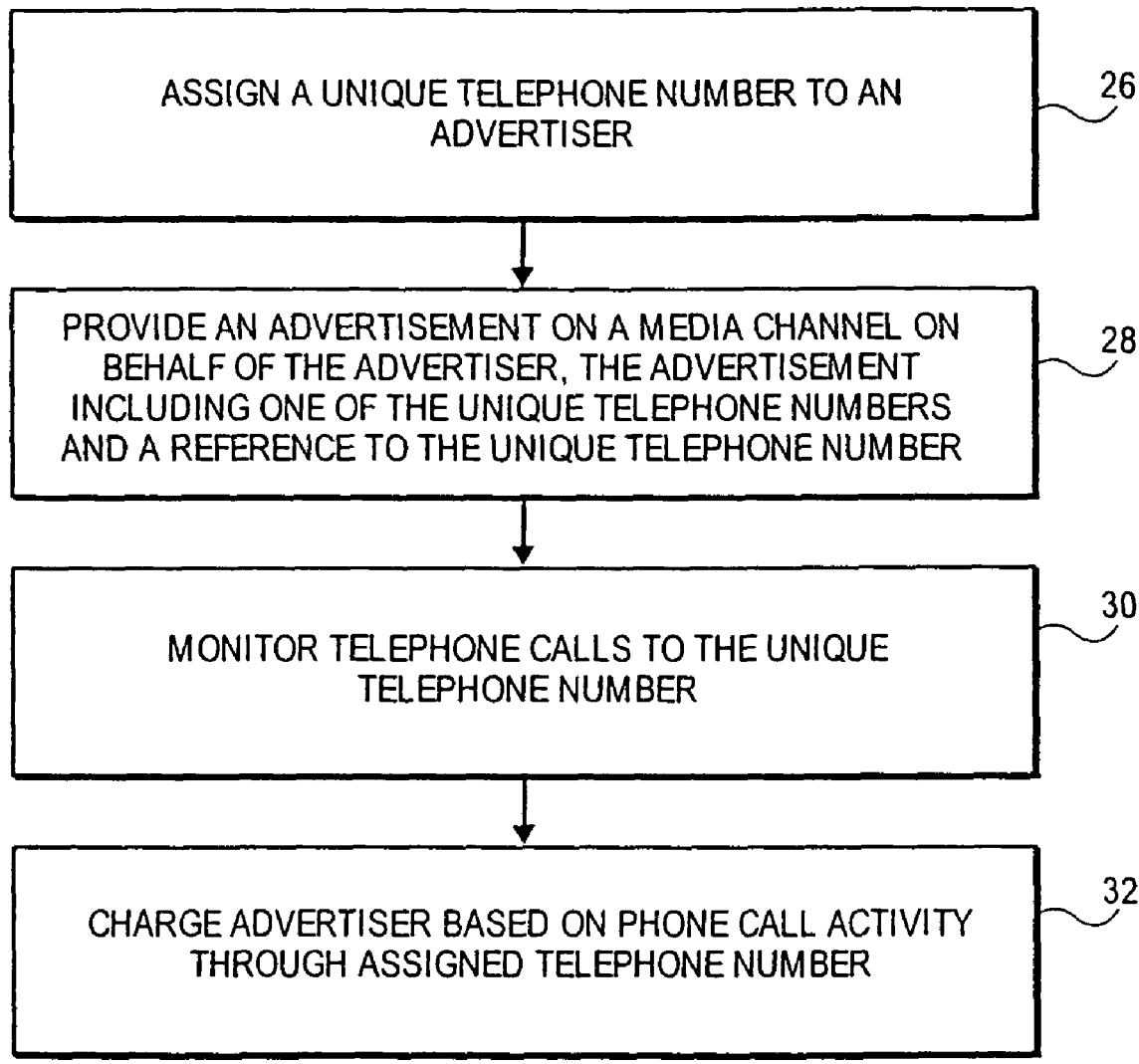
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
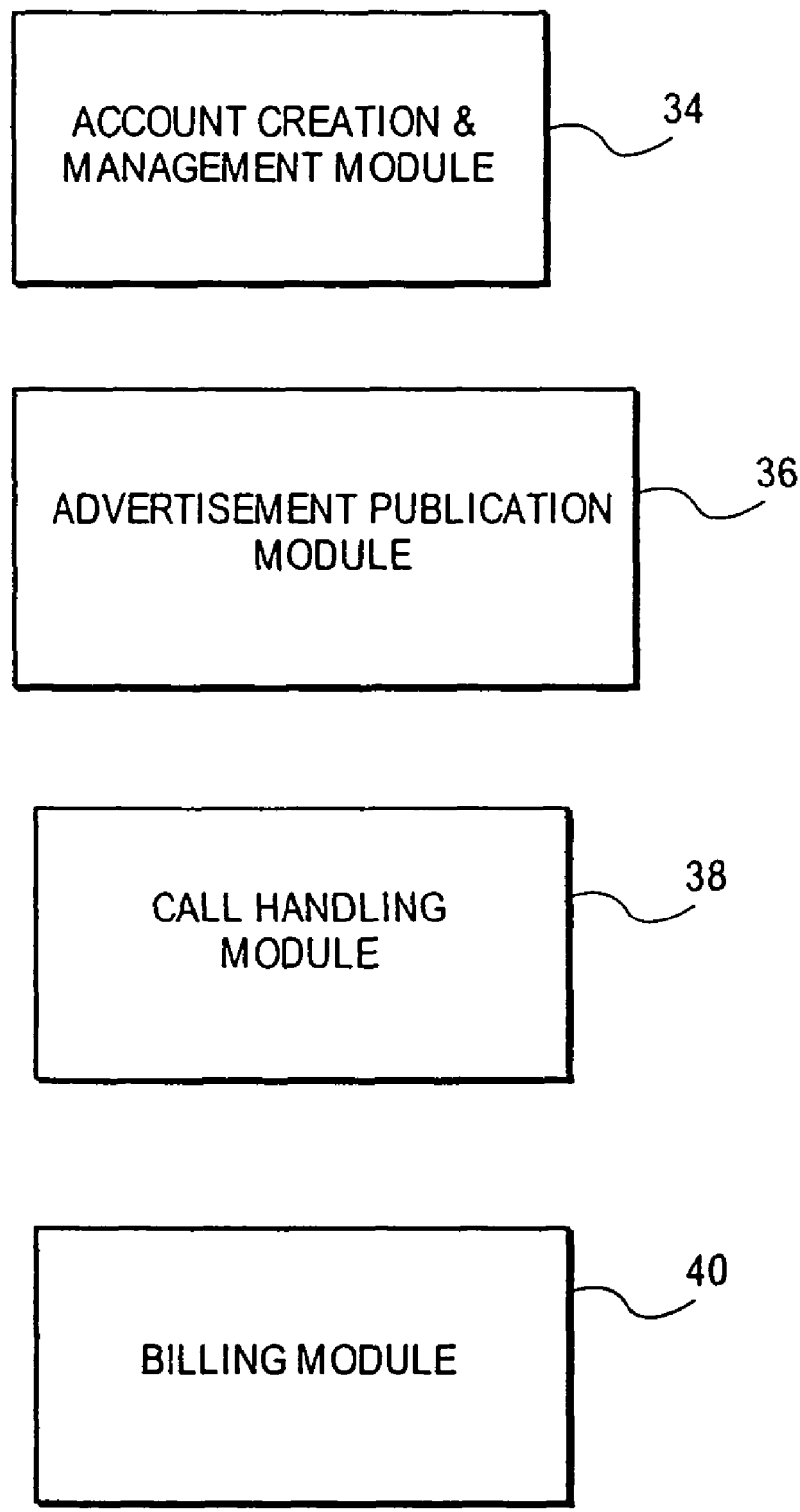
FIG. 4 shows a high level functional description of a system in accordance with one embodiment of the present invention.

FIG. 4 of the drawings shows a functional description of a system to implement the method of FIG. 3 is shown. Referring to FIG. 4, the system includes account creation and management module 34, advertisement publication module 36, call handling module 38, and billing module 40. In alternative embodiments, additional, less, or different modules may be included in the system without departing from the invention.

Figure 5:
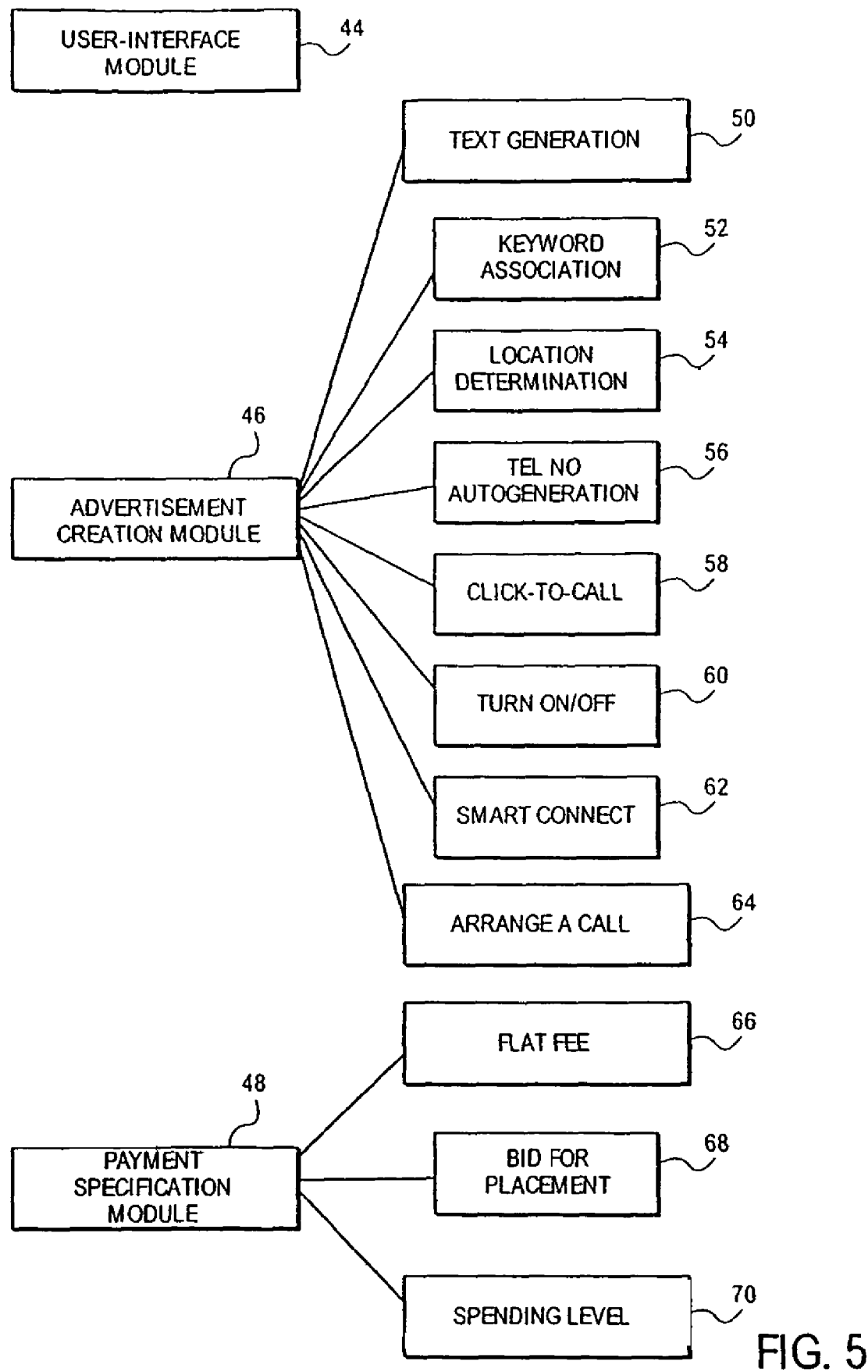
FIG. 5 illustrates the Account Creation and Management module of the system, in greater detail.
Figure 8A:
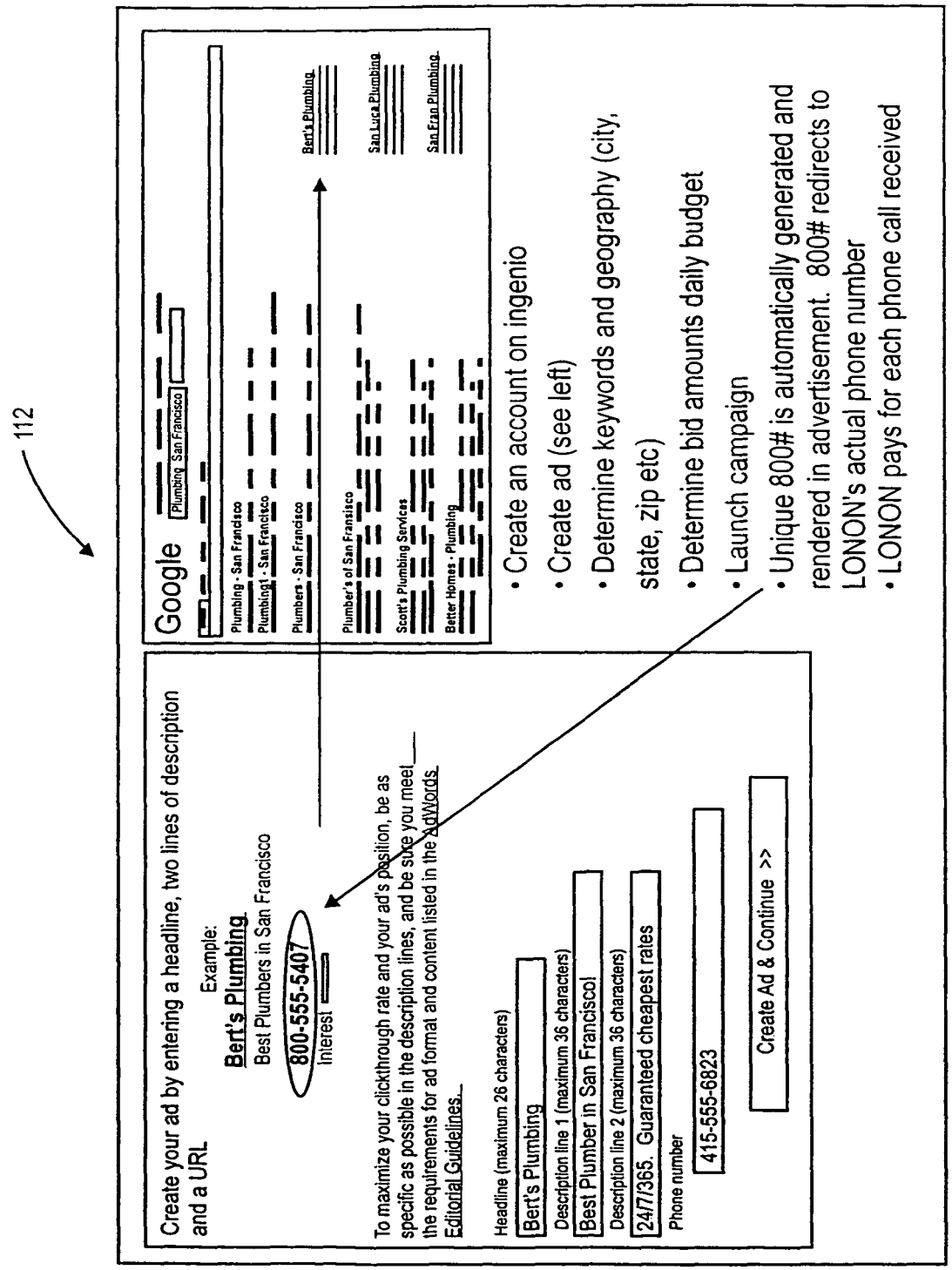
FIG. 8A shows an example of a user interface that may be presented to a user during advertisement creation, in accordance with one embodiment of the present invention.
Figure 8B:
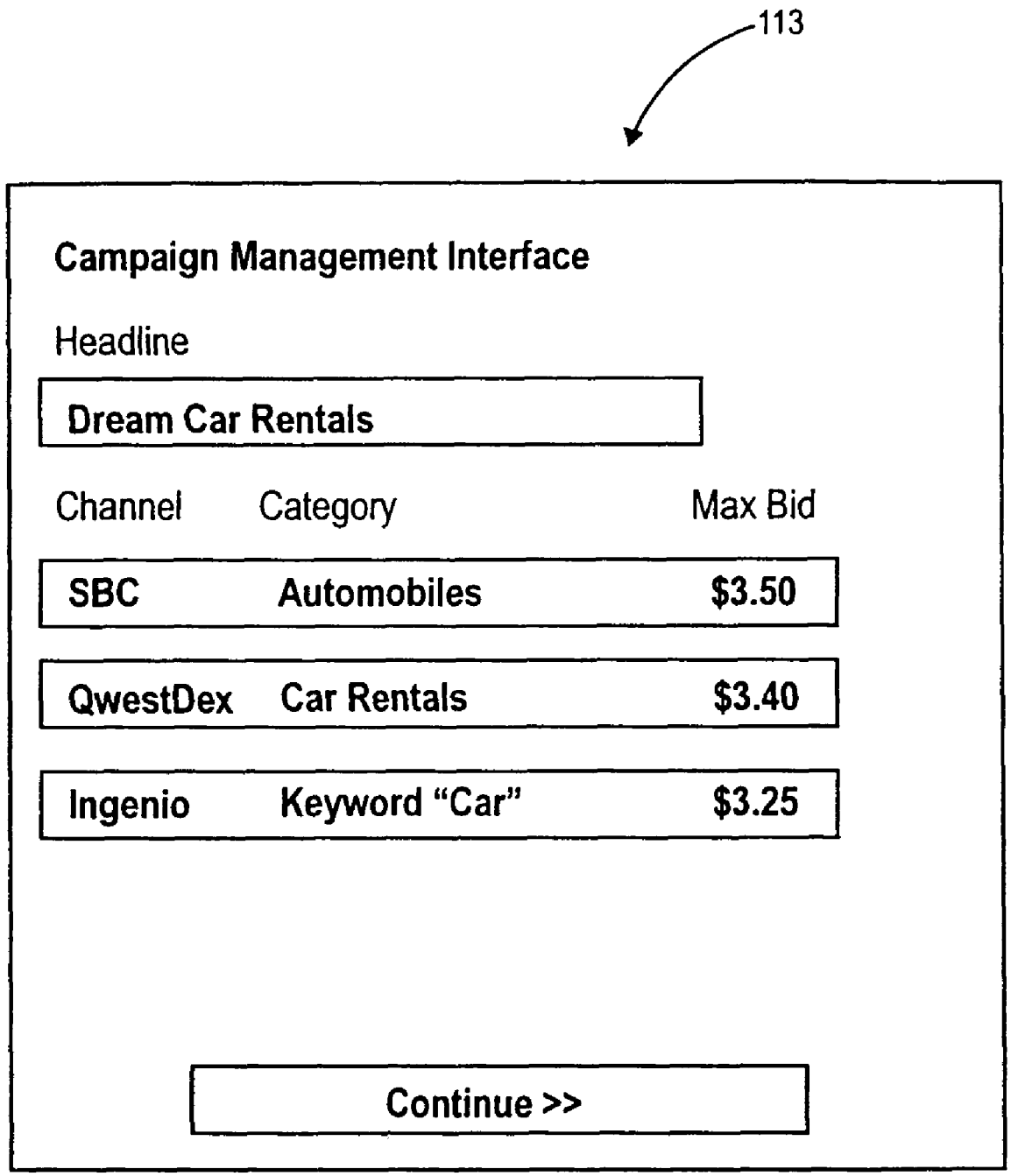
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will only be displayed to clients within the San Francisco area.

The module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1-800-YEL-PAGES-1234, the call will be automatically routed to Burt's telephone as will be described in more detail below.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not made published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the without departing from the invention.

Figure 6:
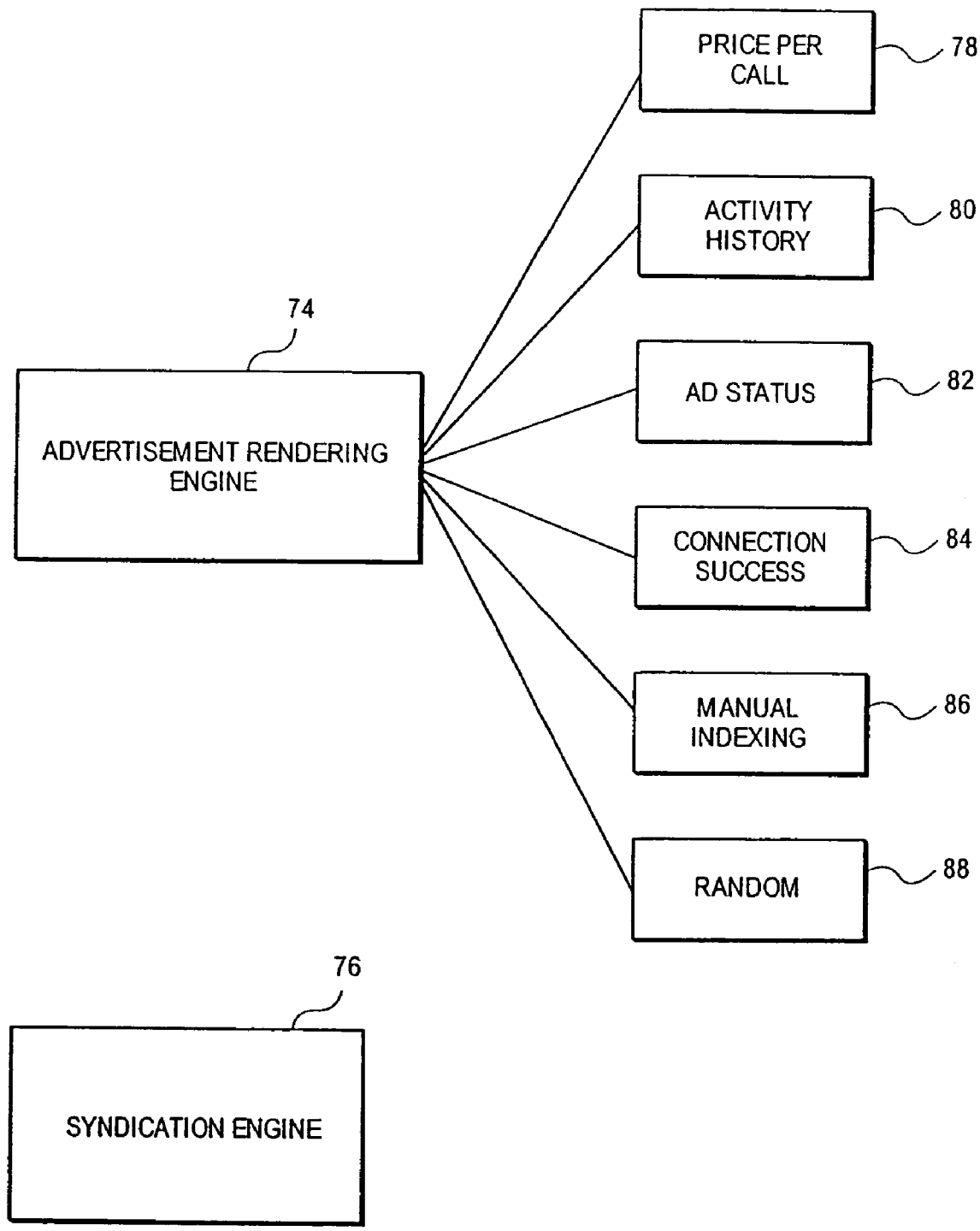
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement rendering engine 74, and an advertisement syndication engine 76. The purpose of the advertisement rendering engine 74 is to automatically render Burt's advertisement on a particular channel. In some embodiments, the advertisement rendering engine 74 causes a campaign management interface 113 (see FIG. 8B of the drawings) to be displayed to an advertiser. The interface 113 allows the advertiser to choose a channel, e.g., SBC, QwestDex, Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement rendering engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately rendered. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
| --- | --- | --- |
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement rendering engine 74 without departing from the invention.

Figure 7:
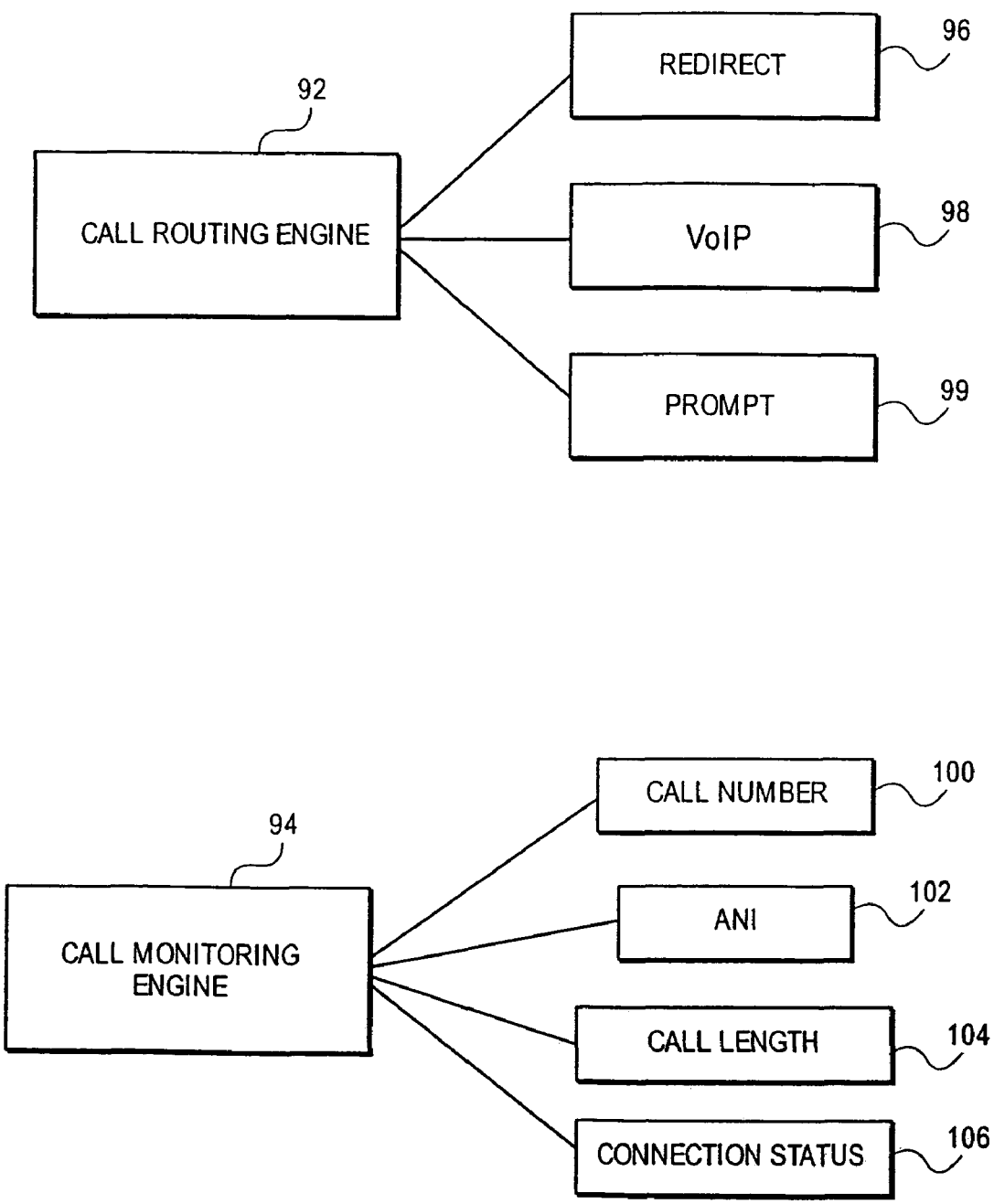
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
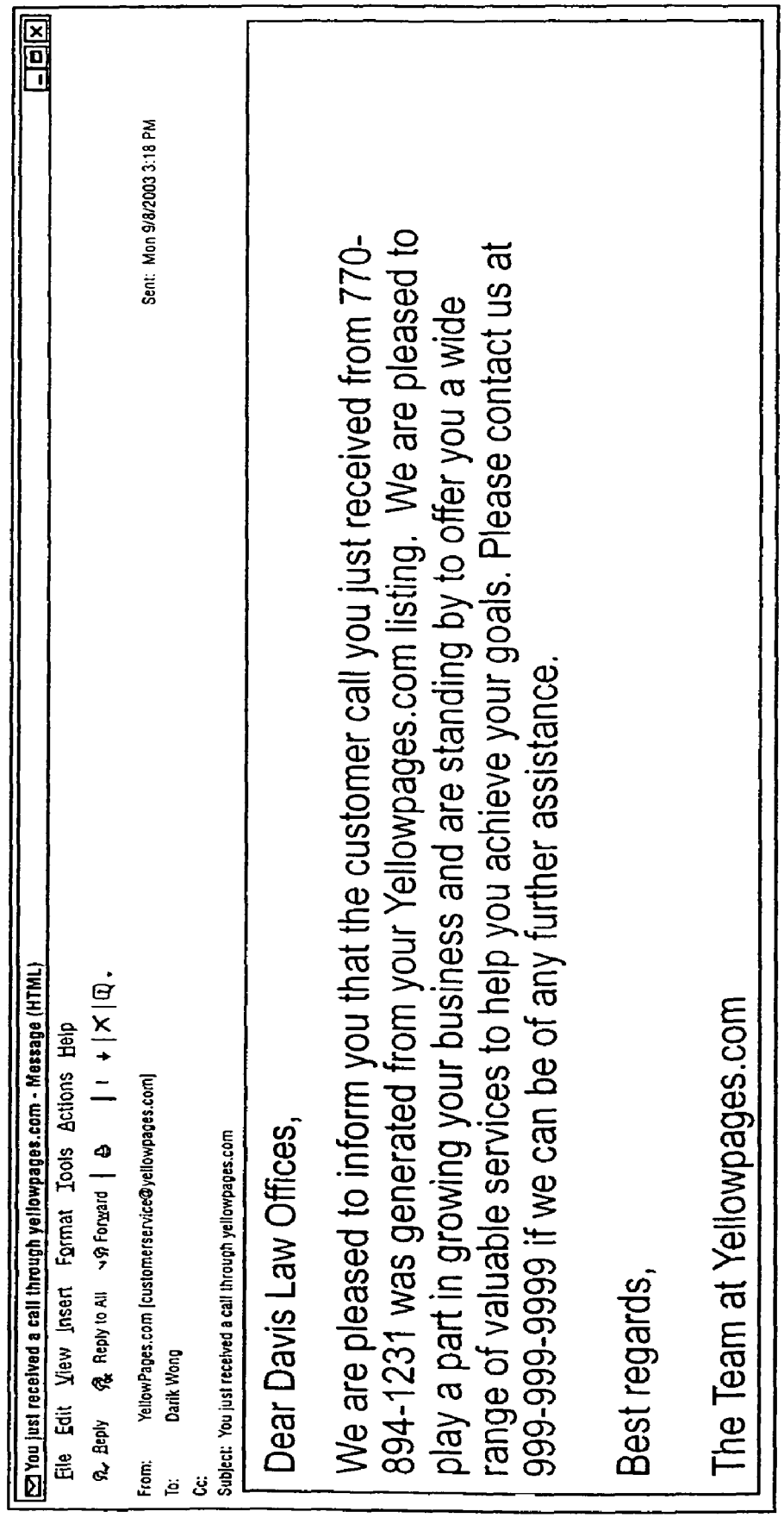
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100-106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
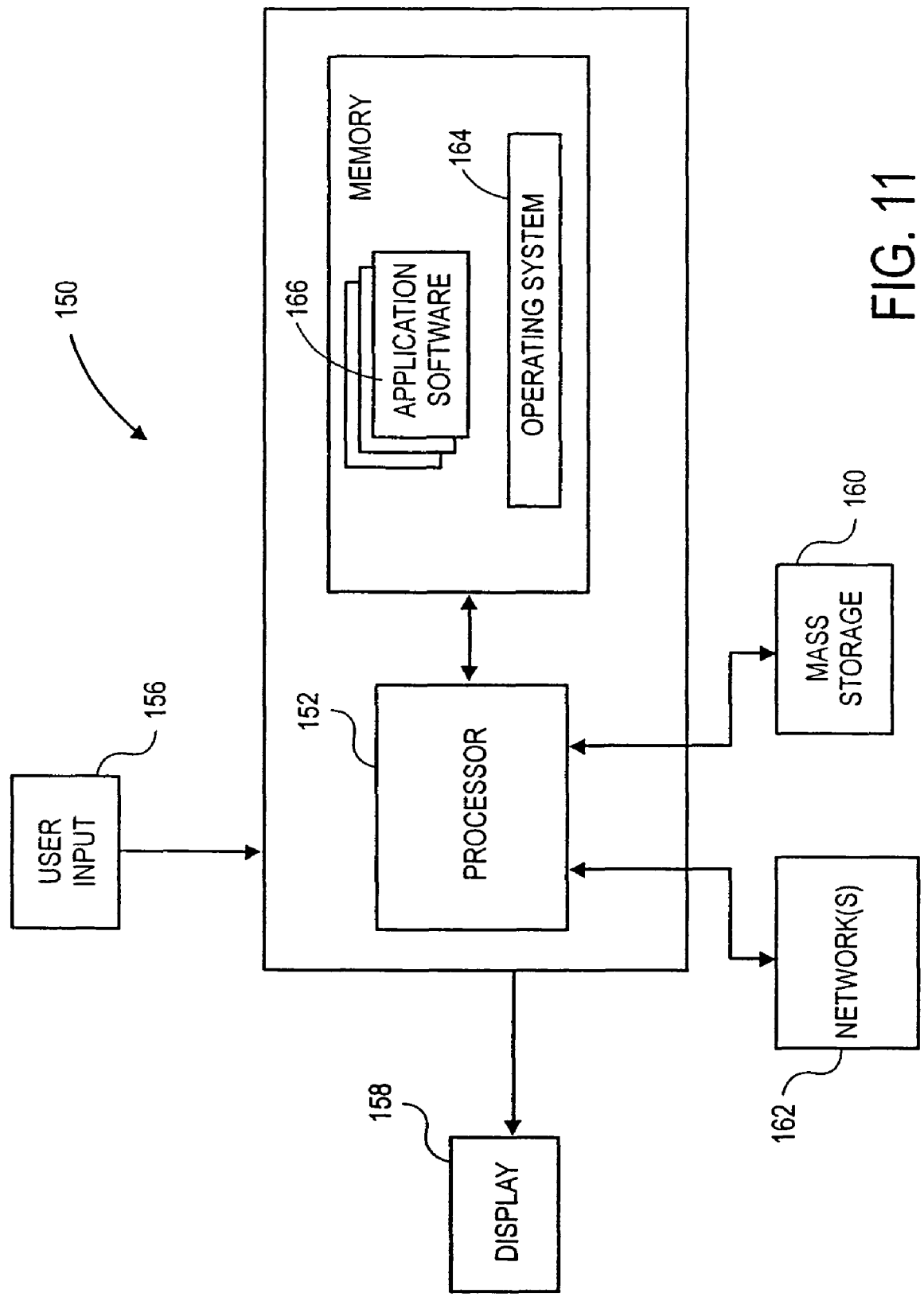
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g. a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.).

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    assigning a reference to be included in an advertisement, the reference to be used to initiate a real time communication connection;
    monitoring communications initiated via the reference;
    determining, using a computing device, whether repeated real time communication connections have occurred between two parties within a predetermined time period; and
    billing for the advertisement in response to the real time communication connection being initiated via the reference, if the real time communication connection is not a repeated connection between the parties that occurs within the predetermined time period.

2. The method of claim 1, wherein the real time communication connection comprises a telephonic connection for a voice communication.

3. The method of claim 2, wherein the telephonic connection is at least partially via voice over Internet protocol.

4. The method of claim 2, wherein the billing comprises billing a fee per telephone call connected via the reference.

5. The method of claim 4, further comprising:
    receiving a specification of the fee from a party who is connected via the real time communication connection.

6. The method of claim 2, wherein the reference comprises a telephone number.

7. The method of claim 2, wherein the reference comprises a click to call reference.

8. The method of claim 1, further comprising:
    associating one or more key words with the advertisement.

9. The method of claim 8, wherein the one or more key words include a geographic location.

10. The method of claim 1, further comprising:
    providing the advertisement in response to a search request.

11. The method of claim 1, further comprising:
    receiving a price bid from an advertiser;
    wherein said billing for the advertisement comprises billing the advertiser for the advertisement based on the price bid; and
    wherein the price bid received from the advertiser is not conditioned on receiving a bid on a reference.

12. A method comprising:
    in response to receiving requests from a set of advertisers, assigning the advertisers with separate references for their respective advertisements which can be displayed concurrently, the references to be used to initiate real time communication connections;
    monitoring communications initiated via the references;
    determining, using a computing device, whether each of the communications initiated via the references is a repeated connection between two parties within a predetermined time period; and
    billing for the advertisements in response to real time communications initiated via the separate references for the real time communications that are not a repeated connection between two parties within the predetermined time period.

13. The method of claim 12, the assigning of the separate references comprising:
    assigning a first reference to a first advertiser, the first reference to be embedded in a first advertisement to facilitate initiation of real time communications with the first advertiser;
    assigning a second reference to a second advertiser, the second reference to be embedded in a second advertisement to facilitate initiation of real time communications with the second advertiser;
    wherein the billing for the advertisements comprises:
    billing for the first advertisement in response to a real time communication initiated via the first reference; and
    billing for the second advertisement in response to a real time communication initiated via the second reference.

14. The method of claim 13, wherein the first advertisement and the second advertisement are for a common field of service.

15. A method, comprising:
    assigning to an advertiser a placement for an undefined advertisement and a communication reference for the advertisement, the communication reference to be used to initiate a real time communication connection;
    determining, using a computing device, whether the real time communication connection is a repeated connection between two parties within a predetermined time period; and
    billing for the advertisement in response to the real time communication connection initiated via the communication reference, if the real time communication connection is not a repeated connection within the predetermined time period.

16. A method, comprising:
    assigning a communication reference to an advertiser to be included in an advertisement, the communication reference assigned independent of a price to be paid by the advertiser for the advertisement, the communication reference to be used to initiate a real time communication connection;
    determining, using a computing device, whether each real time communication connection initiated via the communication reference is a repeated connection between two parties within a predetermined time period; and
    billing for the advertisement in response to each real time communication that is initiated via the communication reference and that is not a repeated connection within the predetermined time period.

17. A method, comprising:
    providing a communication reference to be included in an advertisement for an advertiser, without the advertiser having to bid to receive the communication reference, the communication reference to be used to initiate a real time communication connection;
    determining, using a computing device, whether a real time communication connection initiated via the communication reference is a repeated connection between two parties within a predetermined time period; and
    billing for the advertisement in response to a real time communication initiated via the communication reference, if the real time communication is not a repeated connection within the predetermined time period.

18. A machine-readable medium having stored thereon a sequence of instructions, which when executed by a data processing system, cause the system to perform a method, the method comprising:

assigning a reference to be included in an advertisement, the reference to be used to initiate a real time communication connection;

after a real time communication is initiated via the reference, determining using a computing device, whether the real time communication connection is a repeated connection between two parties within a predetermined time period; and billing for the advertisement, if the real time communication connection is not a repeated connection within the predetermined time period.

19. The medium of claim 18, wherein the real time communication connection comprises a voice communication over a telephonic connection.

20. The medium of claim 19, wherein the telephonic connection is at least partially via voice over Internet protocol.

21. The medium of claim 19, wherein the method further comprises:

receiving a specification of a fee from a party who is connected via the real time communication, wherein the billing is in accordance with the specification of the fee.

22. The medium of claim 19, wherein the reference comprises one of:

a telephone number and a click to call reference.

23. The medium of claim 18, wherein the assigning is independent of a price to be paid by an advertiser for the advertisement.

24. A data processing system, comprising:

a memory to store a set of instructions; and at least one processor coupled to the memory to execute the instructions, the instructions configured to cause the at least one processor to:

assign a reference to be included in an advertisement, the reference to be used to initiate a real time communication connection;

determine whether the real time communication connection is a repeated connection between two parties within a predetermined time period; and billing for the advertisement as a response to the real time communication connection, if the real time communication connection is not a repeated connection within the predetermined time period.

25. The system of claim 24, wherein the real time communication connection comprises a telephonic connection for a voice communication.

26. The system of claim 25, wherein the telephonic connection is at least partially via voice over Internet protocol.

27. The system of claim 25, wherein the reference comprises one of: a telephone number and a click to call reference.

28. The system of claim 24, wherein the instructions are further configured to cause the at least one processor to receive a price bid from an advertiser, wherein the billing is in accordance with the price bid and wherein the price bid received from the advertiser is not conditioned on receiving a bid on a reference.

29. The system of claim 24, wherein the assigning is independent of a price to be paid by an advertiser for the advertisement.

* * * * *